United States Patent
Levi et al.

(10) Patent No.: US 7,376,144 B2
(45) Date of Patent: May 20, 2008

(54) PROTOCOL FOR NATIVE SERVICE TRANSPORT OVER POINT-TO-MULTIPOINT PASSIVE OPTICAL NETWORKS

(75) Inventors: David Levi, Shoham (IL); David Ivancovsky, Maccabim (IL)

(73) Assignee: BroadLight Ltd., Ramat Gan (IL)

( * ) Notice: Subject to any disclaimer, the term of this patent is extended or adjusted under 35 U.S.C. 154(b) by 726 days.

(21) Appl. No.: 10/468,025

(22) PCT Filed: Feb. 17, 2002

(86) PCT No.: PCT/IL02/00120

§ 371 (c)(1),
(2), (4) Date: Dec. 5, 2003

(87) PCT Pub. No.: WO02/067516

PCT Pub. Date: Aug. 29, 2002

(65) Prior Publication Data

US 2004/0076171 A1     Apr. 22, 2004

(30) Foreign Application Priority Data

Feb. 21, 2001     (IL)     ..................... 141578

(51) Int. Cl.
*H04L 12/43* (2006.01)
(52) U.S. Cl. ..................... 370/458; 370/468
(58) Field of Classification Search ............ 370/432, 370/442–444, 458–459, 468
See application file for complete search history.

(56) References Cited

U.S. PATENT DOCUMENTS 5,173,899 A * 12/1992 Ballance .............. 370/503
5,453,988 A * 9/1995 Clarke ................. 370/442
5,509,003 A * 4/1996 Snijders et al. ........... 370/294
5,570,355 A * 10/1996 Dail et al. ............. 370/352
5,648,958 A * 7/1997 Counterman ............ 370/458
5,754,555 A * 5/1998 Hurme et al. ........... 370/522

(Continued)

FOREIGN PATENT DOCUMENTS

WO     97 45972 A     12/1997

OTHER PUBLICATIONS

International Telecommunication Union (ITU-T) G.983.1 (Oct. 1998), Series G: Transmission Systems and Media, Digital Systems and Networks, Broadband optical access systems based on Passive Optical Networks (PON), Geneva, 1998.*
Dail et al; "Adaptive Digital Access Protocol: A MAC Protocol for Multiservice Broadband Access Networs"; IEEE Communications Magazine, vol. 34, No. 3, Mar. 1996, pp. 104-112, XP000557382.

(Continued)

*Primary Examiner*—Kwang Bin Yao
*Assistant Examiner*—Andrew Lai
(74) *Attorney, Agent, or Firm*—Browdy and Neimark

(57) ABSTRACT

A method for information transfer allowing for native transfer of voice, data, and any other digital service information over a passive optical network, comprising; the LT transmitting downstream in serially ordered frames broadcast to all of the NT's at a fixed interval; the NT's transmitting upstream in serially ordered frames, said frames being divided into serially ordered time slots, at most one NT transmitting information for at most one service type in each slot; the LT and the NT's exchanging management information, and the LT and the NT's natively transporting service information to each other in both the upstream and downstream directions, according to said management information exchanged between the LT and the NT's.

13 Claims, 1 Drawing Sheet

U.S. PATENT DOCUMENTS

| | | | |
|---|---|---|---|
| 5,790,522 A * | 8/1998 | Fichou et al. | 370/236 |
| 5,978,374 A * | 11/1999 | Ghaibeh et al. | 370/395.43 |
| 7,031,343 B1 * | 4/2006 | Kuo et al. | 370/473 |
| 2001/0005376 A1 * | 6/2001 | Van De Voorde et al. | 370/442 |

OTHER PUBLICATIONS

"Broadband Optical Access Systems Based on Passive Optical Networks (PON)" ITU-T Recommendation G.983.1, Oct. 1998, pp. 1-118.

* cited by examiner

US 7,376,144 B2

PROTOCOL FOR NATIVE SERVICE TRANSPORT OVER POINT-TO-MULTIPOINT PASSIVE OPTICAL NETWORKS

FIELD OF THE INVENTION

The present invention generally relates to the field of high-speed data communication. More specifically, the present invention relates to the field of communication over passive optical networks. The present invention relates to the use of such networks for the native transport of IP and ATM data, as well as voice, and any other service.

DEFINITION OF TERMS USED IN THE INVENTION

In this invention, the following terms are used according to their definitions here.

ATM—Asynchronous Transfer Mode. A protocol for service transfer in which data is sent in 53 byte cells, the first 5 of which comprise a header, and are followed by a 48 byte payload. ATM is the standard used by telecommunications company backbones.

Churning—A basic encryption mechanism used to encrypt broadcast downstream data in a PON. Each NT has a different churning key, used for decrypting data intended for it. Churning offers the basic level of protection for data security in a PON, and is necessary because every NT receives all of the downstream data.

Downstream—The direction of flow from the LT to the NT's.

DSP—Digital Signal Processor. A specialized processor for real-time processing. DSP's are engineered to perform a particular function and are not flexible in the manner of a personal computer processor.

Filtering—The method by which each NT determines which downstream service information is intended for it.

HEC—Header Error Control. Algorithm for checking and correcting errors in service transmission headers.

IP—Internet Protocol. A protocol for service transfer in which data is sent in variable length packets, containing a header with addressing, type-of-service specification, fragmentation and reassembly, and security information. IP is the protocol used by Internet and by almost all computers for data communication.

LAN—Local Area Network. A user-side data network for providing individual user's with data access by way of a single gateway to the Internet (in this case the NT).

LT—Line Termination. The network-side interface of the PON. The LT is connected to the backbone lines for service transport of voice, IP data, ATM data, and optionally other forms of data. This is sometimes referred to as the head end of the PON.

NT—Network termination. The user-side interface of the PON. The NT is connected to the user's internal infrastructure for service transport, such a PBX for voice transport and a LAN for data transport. This is sometimes referred to as the user end of the PON.

PBX—Private Business eXchange. A telephone system used for routing and managing voice calls in a business.

PCM—Pulse Code Modulation. Digital transmission of analog voice information through sampling and encoding the samples using a fixed number of bits.

PON—Passive optical network. A point-to-multipoint network in which a single LT broadcasts downstream data to multiple NT's, and each NT communicates with the LT in the upstream direction using TDMA methods. Transport lines are split using passive optical methods only.

PPP—Point-to-Point Protocol. A low-level networking protocol.

TDMA—Time Division Multiple Access. An upstream transmission technique common in point-to-multipoint networks, in which said upstream transmission is coordinated according to time-slots assigned by the LT, in which each time slot contains the transmission of a single NT.

Upstream—The direction of flow from the NT's to the LT.

BACKGROUND OF THE INVENTION

A high-speed access system provides an efficient way for a relatively large number of small-scale users to share the high-speed network. It concentrates several service traffic streams to a single point of entry to the high-speed backbone so as to share the broadband service economically. A PON, or passive optical network, is one such system. PON's have gained in popularity because of their capability to supply a high bandwidth at low cost, due to the fact that the splits between lines are of a purely optical and passive nature. PON's have the potential to supply the full range of all currently known and new serviced being offered and considered for residential and business customers, over a single line. The most common services today are voice and data, where data is transported using IP or ATM protocols.

The use of a PON requires an efficient multiplexing function to manage the mixed upstream service traffic from the multiple users, or NT's, at the connection point to the network, or the LT. Such a protocol is necessary to prevent collisions between the many information transport streams competing for access to the backbone networks through the single LT.

The prior art provides for a method of service transport over a PON, using ATM protocols for transfer of all service types. This is called APON. U.S. Pat. No. 5,978,374 and the International Telecommunications Union standard G.983 relate to APON protocols.

This existing art is a rather cumbersome way to provide service transport over a PON, as all information being transported must be wrapped in ATM cells at one end, and unwrapped at the other. This wrapping and unwrapping requires a significant amount of work, as well as adding significant overhead because of the addition of ATM headers, which is a drain on bandwidth resources. Furthermore, because of the nature of certain synchronous services, such as voice calls, much of this ATM conversion must be done in real-time, requiring the installation of DSP's at all of the network terminations. Such extensive deployment of DSP's raises costs for service providers. A further disadvantage of the prior art is that the need to convert everything to ATM cells increases the potential for jitter.

Alternatively, according to the prior art many businesses rely on separate suppliers for each of their service needs, most notably voice and data, in order to provide native transport of both. This leads to a situation in which such enterprises are dependent on two or more separate technologies provided by two or more separate suppliers, lowering efficiency and raising costs to the business.

It would be desirable to supply all existing and future services over a single line, using native service transport. Surprisingly, the present invention overcomes the shortcomings of the prior art and accomplishes the aforementioned tasks.

SUMMARY OF THE INVENTION

The present invention provides a method for native service transport over passive optical networks. The present invention provides a means for supplying a customer with voice and data services over a single line, through a single supplier, without the disadvantage of having to convert all services into a single service type at the transmitting end, and then having to convert them back to their original service type at the receiving end.

In accordance with a general aspect of the invention, service information is broadcast in the downstream direction by the LT to all of the NT's, in 125 microsecond frames.

Because all information sent downstream is broadcast to all of the NT's, it is necessary to encrypt downstream transmissions, with the exception of transmissions intended for all of the NT's. In the preferred embodiment of the present invention this encryption is done using churning, a method known to those skilled in the art. Other encryption methods can also be used with the present invention.

Downstream service information is broadcast in blocks. Each block is preceded by a block header containing the block's type of service, length, and bits used for error checking and synchronization between the LT and the NT's. The length of each block is dynamically set by the LT according to the priorities of each service type and the amount of incoming information for each service. Service type priorities according to the present invention are configurable. Synchronous services such as voice will always have higher priorities than asynchronous services such as data.

All downstream information for a particular service type is broadcast in one block, regardless of which NT is its destination. Existing methods known to those skilled in the art are used to filter downstream service information, with the exception of voice, which is filtered according to a map of time slots distributed from the LT to the NT's at regular, frequent intervals. This map does not need to be transmitted in every frame, so long as it is transmitted with sufficient frequency to provide real-time updates reflecting any changes in the call-to-time-slot mapping, caused by new calls or termination of old calls. Voice service is the highest priority service according the present invention, in the downstream and upstream directions, and is always guaranteed to receive sufficient bandwidth to transfer all calls without any interruption or interference from the PON, defined as the transmission of 8 bits per 125 microsecond frame.

Each downstream frame contains a "PLOAM" block ("Physical Layer Operations, Administration, Management) containing synchronization information, error-checking mechanisms, and a map of grants according to which the NT's will receive permission to transmit in the upstream direction. A grant allocates an upstream timeslot to a particular NT for transmission of a particular service type.

Additional management information is defined as a management service type, and is broadcast downstream as a standard service type, with a standard block header, according to the need. This management service type information sent from the LT to the NT's consists of messages used for distributing and changing encryption keys; notifying the NT's of the status of the LT and its ability to broadcast service information; synchronizing the NT's with the LT; assigning logical addresses to NT's initialized on the network, for use in the downstream service filtering process; and error-checking and verifying the integrity of transmitted data. The map of downstream voice timeslots is also part of the management service information.

In the upstream direction individual NT's transmit service information in a TDMA manner, where each NT knows when it should transmit what service type according to the grant map distributed by the LT in the PLOAM block. Upstream frames are divided into slots of fixed length, which are configurable on initialization of the LT. A given NT transmits all of its information for a given service in consecutive slots, where the first slot in the series starts with a 3-byte header whose role is to provide enough distance between consecutive slots to prevent collisions, and to assist in synchronization between said NT and the LT.

In the upstream direction there is no requirement that all service types from a given NT must be transmitted consecutively, or that all information for a particular service across all NT's must be transmitted consecutively, with the exception of voice. All upstream voice information from all NT's is sent in a consecutive series of slots. Within this series of slots, each NT transmits a 3-byte header as described above, followed by all of its voice service information consecutively, at a rate of 8 bits per frame per call. Once every constant number of frames, at the end of its voice service information, each NT transmits a fixed number of bits reporting to the LT its queue length for each service type. Based on this data and the priority configured for each service, the LT allocates the upstream grants. The frequency at which this queue information is transmitted is configurable.

A management service type exists in the upstream directions as well. Each NT uses this service to send management messages to the LT as needed. Such management messages includes the maintenance status of each NT and its ability to transmit in the upstream direction, acknowledgements of reception of downstream management messages, and initialization information when an NT is added to the network or removed from it.

Each NT sends the LT a map of the upstream voice service information, letting the LT know which 8 bits within that NT's voice service sub-slot are for which call. This map does not need to be transmitted in every frame, so long as it is transmitted with sufficient frequency to provide real-time updates reflecting any changes in the call-to-time-slot mapping, caused by new calls or termination of old calls. The NT transmits this map as part of the upstream management service information.

DETAILED DESCRIPTION OF THE PREFERRED EMBODIMENTS

Figure 1:
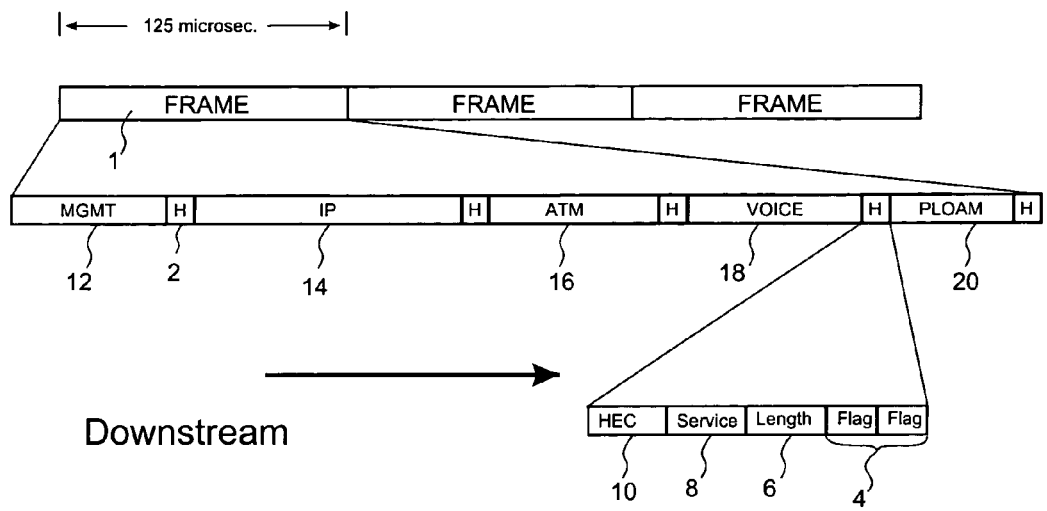
FIG. 1 illustrates the composition of the downstream frames.
Figure 2:
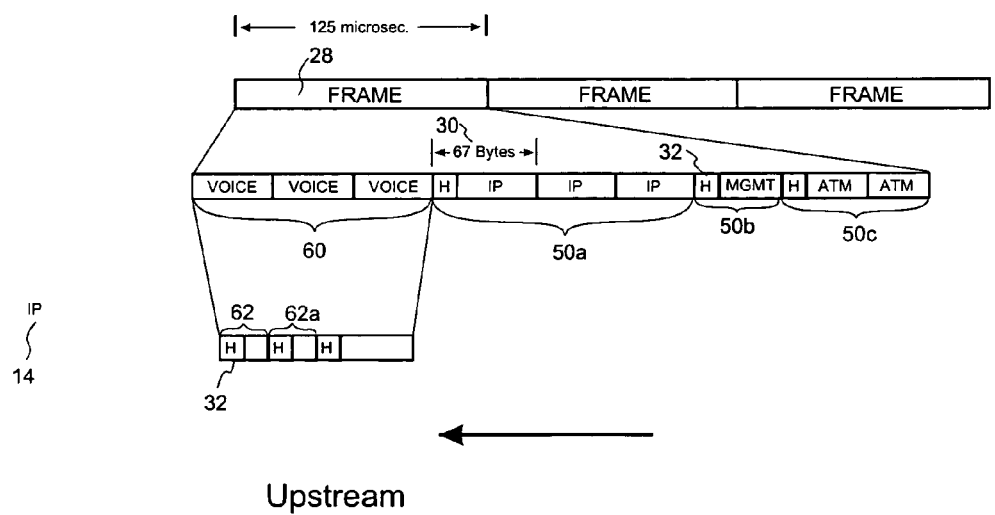
FIG. 2 illustrates the composition of the upstream frames.

In the preferred embodiment according to the present invention, both the LT and the NT's transmit bits at a rate of 622.08 million bits per second (mpbs), divided into frames of 125 microseconds (1). Alternative embodiments may transmit at 155 mbps, or any other bandwidth desired.

In the downstream direction the LT broadcasts all service information, such that each NT receives all of the information. In the preferred embodiment of the present invention a method known to those skilled in the art called churning is used to encrypt downstream data to protect service information intended for one NT for being read by others. In alternative embodiments of the current invention other data protection methods may be used, or no protection may be used at all.

In each downstream frame (1) the LT broadcasts all information of a given service type together, in one block. In the preferred embodiment of the present invention the LT broadcasts a 5-byte header (2) before each service block. This header comprises a one byte double flag (4) to indicate to the NT's the start of a service block, and to assist in synchronization between the LT and the NT's, two bytes indicating the length of the service block (6), one byte indicating the block's service type (8), and a one byte HEC (10) for error-checking the contents of this header.

After broadcasting the header, the LT broadcasts the service information itself. In the preferred embodiment of the present invention methods have been developed for filtering voice, management information, IP packet, and ATM cell service types. This should not be construed, however, to imply that the present invention is limited to the transport of these service types.

The LT broadcasts management information as a management service type, in a management service type block 12. The LT broadcasts the management block (12) whenever it is needed. The management block (12) comprises management messages, each of which is assigned has a unique ID. Each management message is 13 bytes long, and comprises a one byte destination address field, a one byte management message ID, 10 bytes of management information, and a one byte error correction field. NT's filter the management service type according to the NT address field, and delineate between management messages according to their fixed length. The LT never fragments management messages; only whole management messages are broadcast. In the preferred embodiment of the present invention the LT sends management messages to distribute and change encryption keys; to notify the NT's of the maintenance status of the LT and its ability to broadcast service information; to synchronize the NT's with the LT; to assign logical addresses to NT's initialized on the PON; and to error-check and verify the integrity of transmitted data.

In a general aspect of the preferred invention the LT regularly sends a management message containing a map of the voice service block 18 with the location of each call's downstream PCM data within said voice service block 18. PCM data comprises 8 bits per call per 125-microsecond frame. The NT's use this map to filter voice service information and match downstream PCM data to individual calls to particular locations within the NT's phone network, if the NT manages more than one phone extension. In the preferred embodiment of the present invention, the LT sends this voice map once every millisecond, or once every 8 frames. Accordingly, the LT does not change the mappings in the voice block 18 in frames in which it does not broadcast a new voice map.

The LT transmits ATM cells with no changes or wrappings. The NT's filter ATM cells in the ATM service block (16) using the ATM header itself. The LT assigns each virtual path address to one NT, using methods known to those skilled in the art, and the NT's read the virtual path address. ATM cells are of a fixed length, allowing the NT's to easily delineate them. In the preferred embodiment of the present invention ATM cells are never fragmented; only whole ATM cells are transmitted.

In the preferred embodiment of the present invention the LT prepends a PPP header to every IP packet. The PPP header, as is known to those skilled in the art, contains the address of the NT to whom the packet is intended, as well as the length of the packet. The NT's use this information to filter and delineate IP packets in the IP service block (14). If an IP packet does not fit into the IP packet service block, the LT fragments it according to methods known to those skilled in the art, and broadcasts each fragment with its own PPP header, in a separate frame.

In each downstream frame 1, the LT broadcasts a PLOAM block (20) containing grants which allocate time slots (30) within the next upstream frame (28) to particular NT's, for transmission of particular services. With the exception of voice, each slot (30) can only be allocated to one NT. Each slot (30) can only be allocated for the transmission of a single service type. The size of these slots (30) can be configured when the LT is initialized, and is constant after that. In the preferred embodiment the slot size is 67 bytes. The LT allocates a series of consecutive slots (50) to each NT, for transmission of each service type. For the purposes of this invention, said series of consecutive slots (50) will be referred to as an upstream block.

The LT allocates voice as follows. It allocates a series of consecutive slots (60) to the upstream transport of voice service for all of the NT's. For the purposes of this invention this series of slots (60) will be referred to as an upstream voice block. Within this series of consecutive slots, the LT allocates each NT a portion of bandwidth (62) sufficient to transmit its voice service information, which in the preferred embodiment is 8 bits of PCM data per call per frame. The individual bandwidths (62) allocated to each NT for voice transport need not be bordered by frame borders. If any individual bandwidth (62) does start or end on a frame border this is purely coincidental, with the exception of the first bandwidth, which starts at the start of the first slot in the series. At a configurable interval, the LT allocates bandwidth for each NT to send it its queue length for each service type. This LT allocates this bandwidth as part of the bandwidth (62) it allocates to the same NT for voice service transport, the bandwidth for transmitting queue length being the end of the bandwidth (62) for voice service transport. In the preferred embodiment of the present invention the LT allocates said bandwidth for each NT to send its queue lengths once every millisecond, or once every 8 frames.

Within the bandwidth (62) allocated to a given NT for voice transport, at the very start of the bandwidth, the NT transmits a 3-byte header (32), whose value is fixed and whose role is to prevent collision between the transmissions of consecutive NT's, and to synchronize between the NT and the LT. For services other than voice, a given NT transmits the same 3-byte header (32) at the start of the upstream block (50) allocated to it for transmission of a given service type, within the bandwidth of the first slot.

The NT's transmit upstream management information as a management service type, comprising management messages of the same format as those sent downstream. The NT's never fragment management messages to fit them into slots; only a whole number of management messages are transmitted by each NT each upstream frame (28). In the preferred embodiment of the present invention an NT fills with empty bits the remainder of its upstream management service block (50b). The NT's send out management messages when necessary. The NT's send upstream management messages in order to report their maintenance statues to the LT; to acknowledge reception of downstream management messages, to send initialization information to the LT when an NT is added to the network; and to inform the LT when an NT is removed from the network.

In a general aspect of the preferred invention each NT regularly sends a management message containing a map of the bandwidth (62) allocated to it for voice service transport within the upstream voice block (60), with the location of each call's upstream PCM data within said bandwidth (62). The LT use this map to match upstream PCM data to individual calls from particular locations within the NT's phone network, if the NT manages more than one phone extension. In the preferred embodiment of the present invention, each NT sends this voice map once every millisecond, or once every 8 frames. Accordingly, the NT does not change the mappings in its voice bandwidth (62) in frames in which it does not broadcast a new voice map.

The NT's send ATM cells with no changes or wrappings. In the preferred embodiment of the present invention NT's do not fragment ATM cells; only a whole number of ATM cells are transmitted by each NT each upstream frame (28). In the preferred embodiment of the present invention each NT fills the remainder of its upstream ATM service block (50c) with empty bits. As the slot size is configurable, the slot size can be configured to match the size of an ATM cell, minimizing wasted bandwidth.

In the preferred embodiment of the present invention the NT's prepend a PPP header to IP packets, where the PPP header contains addressing and length information as in the downstream frames. If an NT cannot fit an entire IP packet into its upstream IP service block (50a), it fragments the IP packet according to methods known to those skilled in the art, and sends each fragment in its upstream IP service block (50a) of a different upstream frame (28).

The invention claimed is:

1. A method for information transfer comprising:
performing a native transfer of voice and digital data service information between a line termination (LT) and a plurality of network terminations (NT's) in a passive optical network by:
the LT transmitting downstream in serially ordered frames of fixed size broadcast to all of the NT's at a fixed interval;
the LT transmitting in each downstream frame, each said downstream frame divided into dynamically sized blocks, the LT transmitting in each of the blocks information of a different service type and each block being of a length that is dynamically defined according to the service type and priority associated with the respective block;
the NT's transmitting upstream in serially ordered frames of fixed size, said frames being divided into serially ordered time slots, at most one NT transmitting information for at most one service type in each slot, said slots being used by NT's in dynamically sized consecutive slots for transmitting service information;
the LT and the NT's exchanging management information; and
the LT and the NT's natively transporting service information to each other in both the upstream and downstream directions, according to said management information exchanged between the LT and the NT's,
wherein the management information exchange between the LT and NT's includes management information sent by the LT in the downstream direction and comprising messages performing the function of distributing a map matching downstream voice time slots to particular calls, according to which NT's filter voice service information.

2. A method according to claim 1, the LT broadcasting in each downstream frame information for a single service in a single block, preceded by a block header, and said block including all information for that service for all the NT's.

3. A method according to claim 2, said block header comprising the block's service type, length, and bits used for error checking and synchronization between the LT and NT's.

4. A method according to claim 1, the LT broadcasting in every downstream frame a PLOAM block comprising a map of grants, allocating said serially ordered upstream time slots to a particular NT for a particular service type.

5. A method according to claim 1, the LT and NT's exchanging management service type blocks containing said management information of claim 1, wherein said management service type blocks are exchanged in accordance with the need for the relevant management information.

6. A method according to claim 5, in which said management information sent by the LT in the downstream direction comprises messages performing the additional functions of,
allocating grants to each NT for service transmission in the upstream direction;
distributing and changing encryption keys;
notifying the NT's of the status of the LT and its ability to broadcast service information;
synchronizing the NT's with the LT;
assigning logical addresses to the NT's;
error-checking and verifying the integrity of transmitted data.

7. A method according to claim 4, the LT allocating for each upstream frame, by means of the grant map of each PLOAM block, consecutive slots to a given NT for a given service.

8. A method according to claim 7, in which at the start of said consecutive slots allocated to a particular NT for a particular service, said NT transmits a slot header performing the functions of providing enough distance between consecutive slots to prevent collisions, and assisting in synchronization between the LT and said NT.

9. A method according to claim 1, the LT allocating for each upstream frame, by means of the grant map of each PLOAM block, a consecutive series of slots for all NT's for voice service information, said consecutive series of slots being divided into bandwidth for each NT, said bandwidth not necessarily being bordered by the borders of individual slots.

10. A method according to claim 9, in which within the bandwidth allocated to each NT for upstream voice service transmission, the NT first transmitting a header performing the functions of; providing enough distance between consecutive slots to prevent collisions, and assisting in synchronization between the LT and said NT.

11. A method according to claim 1, in which once every constant number of upstream frames each NT reporting to the LT the length of the queue awaiting upstream transport for each type of service information, and these queue lengths being used by the LT to dynamically allocate upstream grants in the PLOAM block.

12. A method according to claim 5, in which said management a information sent by the NT's in the upstream direction comprises messages performing the functions of; distributing a map matching upstream voice time slots to particular calls, within the upstream slots allocated by the LT; acknowledging the reception of management information received from the LT; and reporting on the status of the NT's and their ability to transmit service information.

13. A method according to claim 1, the LT and NT's transmitting in frames of length 125 microseconds.

* * * * *